US012673640B2

(12) United States Patent
    Karppinen

(10) Patent No.:  US 12,673,640 B2
(45) Date of Patent:        Jul. 7, 2026

(54) CLEANING UNIT AND CLEANING ARRANGEMENT FOR VEHICLE TIRES

(71) Applicant: Tyre Wash Tws Oy, Oulu (FI)

(72) Inventor: Juha Karppinen, Oulu (FI)

(73) Assignee: Tyre Wash Tws Oy, Oulu (FI)

( * ) Notice: Subject to any disclaimer, the term of this patent is extended or adjusted under 35 U.S.C. 154(b) by 407 days.

(21) Appl. No.: 18/270,889

(22) PCT Filed: Feb. 7, 2022

(86) PCT No.: PCT/FI2022/000001
    § 371 (c)(1),
    (2) Date: Jul. 5, 2023

(87) PCT Pub. No.: WO2022/171926
    PCT Pub. Date: Aug. 18, 2022

(65) Prior Publication Data
    US 2024/0067139 A1      Feb. 29, 2024

(30) Foreign Application Priority Data

Feb. 9, 2021     (FI) ..................................... 20217030

(51) Int. Cl.
    *B60S 3/04*          (2006.01)
    *A46B 5/00*          (2006.01)
                        (Continued)
(52) U.S. Cl.
    CPC ............ *B60S 3/042* (2013.01); *A46B 5/0066*
        (2013.01); *B08B 1/12* (2024.01); *B08B 1/20*
                                                (2024.01);
                        (Continued)

(58) Field of Classification Search
    CPC ..... B60S 3/04; B60S 3/06; A46B 7/04; B08B 13/00
    See application file for complete search history.

(56) References Cited

U.S. PATENT DOCUMENTS 7,937,793 B1     5/2011  Gilbert
    2015/0307067 A1  10/2015 Movsesian
    2021/0001822 A1*  1/2021 Szczerba ................. B60S 3/042

FOREIGN PATENT DOCUMENTS

CN     112277893 A     1/2021
    GB       2191392 A  * 12/1987  .............. A46B 9/02
    JP    2002349785 A    12/2002

OTHER PUBLICATIONS

CN 112277893 A machine langauge English translation.
                        (Continued)

*Primary Examiner* — Michael D Jennings
(74) *Attorney, Agent, or Firm* — BelayIP

(57) ABSTRACT

A cleaning arrangement for cleaning vehicle tires is disclosed. The cleaning arrangement includes at least one cleaning module. The cleaning module has a frame with walls, a floor and a collection space for contaminants and one or more cleaning units above the collection space. The cleaning unit has a grate arrangement and a plurality of bristle rails as well as intermediate rails transverse to the direction of travel of the vehicle. At least a portion of the rails are secured to the grate arrangement by flexible arrangements that flex as the vehicle passes over the rails, causing the rails to tilt and vibrate the tire, thereby enhancing the release of contaminants from the tires.

13 Claims, 4 Drawing Sheets

(51) Int. Cl.
| | |
|---|---|
| B08B 1/12 | (2024.01) |
| B08B 1/20 | (2024.01) |
| B08B 3/04 | (2006.01) |
| B08B 13/00 | (2006.01) |
| B08B 15/00 | (2006.01) |

(52) U.S. Cl.
CPC ................ B08B 3/04 (2013.01); B08B 13/00 (2013.01); B08B 15/00 (2013.01); *A46B 2200/3046* (2013.01)

(56)        References Cited

OTHER PUBLICATIONS

JP2002349785 A machine langauge English translation.
Written Opinion of the International Searching Authority, PCT/FI2022/000001, Apr. 13, 2022.

* cited by examiner

200

219

222

210

223

214     221     220

316     317     318

CLEANING UNIT AND CLEANING ARRANGEMENT FOR VEHICLE TIRES

CROSS REFERENCE TO RELATED APPLICATIONS

This application is a national phase application of International Application No. PCT/FIP2022/000001, filed Feb. 7, 2022, which claims priority to Finnish Patent Application 20217030, filed Feb. 9, 2021, the content of both of which is herein incorporated by reference.

BACKGROUND OF THE INVENTION

Field of the Invention

The invention relates to a cleaning unit for vehicle tires, the cleaning unit having a grate arrangement and a plurality of bristle rails, the bristle rails having an upper surface of the bristle rail, the bristle rails having bristles on the upper surface of the bristle rail. The invention further relates to a cleaning arrangement for vehicle tires, wherein the cleaning arrangement comprises at least one cleaning module, the cleaning module having a frame with walls and a floor and a first end and a second end of the frame, and a collection space for contaminants collected by the cleaning arrangement.

Description of Related Art

It is known that street dust and other contaminants found in urban environments adhere to vehicle tires in particular. When stuck to the tires, these contaminants find their way into vehicle storage facilities. Similarly, transporting and handling of goods and their transfer in terminals and production depots, as well as in goods reception facilities, give rise to and spread a wide range of pollutants. Delivery truck tires contain street dust and sand as well as all sorts of other contaminants within the terminal area. Dust, sand and other contaminants are trapped in the tires of vehicles used in unloading situations, and these can then be transferred to warehouses and, in some cases, to production facilities. During storage, dust from cardboard packaging material is often generated during the handling of goods and the unpacking of cardboard boxes. This kind of dust is often difficult to control and can enter the interior of production facilities, and in the worst case, make its way all the way to the production lines.

Street dust is finely ground asphalt concrete and sand, but it also contains, for example, soot particles, material released from car tires and other parts of cars as well as soil microbes. Street dust also contains organic microbes of animal origin as well as pollen. Street dust is most problematic during dry weather in the spring, when wind and traffic lift dust that has accumulated on the streets into the breathing air. In the spring season, there is also plenty of pollen present. Street dust also includes particles from construction and renovation projects. These can be a year-round problem. Street dust is not only a problem in large cities, but high particle concentrations can also occur in small municipal centers and agglomerations.

Regular cleaning of floor surfaces is used to remove street and other types of dust from indoor parking garages and the like. However, this is expensive and quite inefficient. The parking garage must be emptied of vehicles, which is inconvenient. Improving air conditioning is also expensive and in the worst case it only spreads street dust to other areas of the building. Attempts can also be made to reduce dust problems by using sweeping machines. However, this is often inefficient and, at worst, only transfers dust from one place to another. Fine dust spreads over the entire area.

Dust can also be reduced in applications where air curtain devices are installed near doors of industrial or production plants, which blow air into the door opening when the door is opened to transfer goods. The air curtain device blows air with high power from above the door opening perpendicular to the floor. The problem here is that the air flow lifts dry dust from the floor, which can thus spread to the production facilities as well.

Food production facilities, hospitals and laboratories are buildings with a high standard of hygiene, which means that all activities must be conducted in a very clean and tidy manner.

However, what is common to all the above is that all dust, sand and other contaminants are superfluous and detrimental to the actual operations.

To reduce dust, there are devices that wash vehicle tires. In general, these are difficult to adapt for the indoors. They require a lot of space to function properly and are generally implemented in such a way that their use introduces additional problems such as noise, water spreading and significantly increased energy consumption. In addition, many of the known devices are such that it is practically impossible to place them in an existing space.

Patent publication U.S. Pat. No. 5,341,828 discloses a system for washing vehicle tires, the system having a plurality of sequentially arranged spray arrangements for spraying water and detergent onto the tires. Quite a lot of water is used here and the tires of the vehicle passing through the system spread a lot of water outside the system. The system is also quite difficult to adapt to existing spaces.

Patent publication U.S. Pat. No. 6,561,201 discloses a device for washing vehicle tires. The device has an elongated structure along which the vehicle travels, and the bottom of the structure is filled with transverse cross-sectional barrier structures with holes for spraying water. This device uses a significant amount of water and requires a powerful pump arrangement and motor to operate it. Furthermore, the water tank must be quite large. The device also wets the vehicle so that water inevitably spreads outside the device. The device is therefore practically impossible to place indoors.

Patent publication US20150307067 discloses a carpet arrangement for cleaning vehicle tires with a grate and rails with bristles on top. The rails are located under the grate so that the bristles extend through the grate. As the vehicle drives over the carpet arrangement, the bristles remove contaminants from the surface of the tires, which fall between the rails. However, the arrangement is difficult to clean, and it is possible that the bristles will only transfer the dust to the air.

There is a clear need for an arrangement that would significantly reduce the entry of dust, dirt and other contaminants with vehicles into indoor spaces such as car parks, warehouses and distribution centers. In addition, there is a need for an arrangement that can be placed in an existing indoor location and that is easy to clean.

BRIEF SUMMARY OF THE INVENTION

An object of the invention is a solution that can significantly reduce the disadvantages and drawbacks associated with the prior art. In particular, it is an object of the invention to provide a solution that is suitable for cleaning vehicle tires indoors.

The inventor has found that most of the dust and dirt in car parks, warehouses, terminals and similar spaces or buildings has entered the spaces in the tires of vehicles, and in particular on the surfaces of the tires that come in contact with the road. Thus, cleaning the tires and collecting the dust and the other dirt that has becomes detached during cleaning substantially reduces the dirtiness of the building. This reduces the need for cleaning and improves the air quality in the entire building. At the same time, the dirtiness of vehicles and other nuisances caused by dust are reduced.

The invention is a cleaning arrangement for cleaning vehicle tires, wherein the cleaning arrangement comprises at least one cleaning module. The cleaning module has a frame with walls, a floor and a collection space for contaminants and one or more cleaning units above the collection space. The cleaning unit has a grate arrangement and a plurality of bristle rails and intermediate rails which are transverse to the direction of travel of the vehicle. At least a portion of the rails are attached to the grate arrangement by flexible arrangements that flex when the vehicle passes over the rails, causing the rails to tilt and vibrate the tire, enhancing the release of contaminants from the tires.

When reference is made in the text to the upper or lower side or similar directions, a situation is described in which the arrangements according to the invention are in their normal operating position.

A cleaning unit for vehicle tires according to an embodiment of the invention has a grate arrangement and a plurality of bristle rails, the bristle rails having a top surface of the bristle rail, and the bristle rails having bristles on the top surface of the bristle rail. According to a preferred embodiment of the invention, the bristle rails are above the grate arrangement transverse to the direction of travel of the vehicle cleaning unit. The cleaning unit also comprises intermediate rails and flexible arrangements. The intermediate rails have an upper surface of the intermediate rails, and the intermediate rails are above the grate arrangement and at least a portion of the intermediate rails are between the bristle rails so that there is a gap between at least a portion of the bristle rails and the intermediate rails. The bristle rails are attached to the grate arrangement with flexible arrangements. The upper surface of the intermediate rails is between the upper surfaces of the bristle rails and the planes formed by the outer ends of the bristles. The different rail types and the vibration of the flexibly attached rails cause vibrations in the tires of the vehicles, which helps in the cleaning of the tires by the bristles. In addition, the intermediate rails reduce the forces exerted on the bristles by the vehicle tires, reducing the wear and tear on the bristles.

In one embodiment of the cleaning unit according to the invention, the intermediate rails are attached to the grate arrangement with flexible arrangements. This feature gives more direction to the vibration of the rails.

In a second embodiment of the cleaning unit according to the invention, the bristle rails have a lower surface of the bristle rails, and the intermediate rails have a lower surface of the intermediate rails, and the flexible arrangements below the bristle rails cover the lower surfaces of the bristle rails, and the flexible arrangements below the intermediate rails cover the lower surfaces of the intermediate rails. This feature enhances the movement of the rails and supports the rails.

In a third embodiment of the cleaning unit according to the invention, the flexible arrangements have such elastic properties that as the vehicle passes over the cleaning unit, the bristle rails and the intermediate rails tilt as the tire of the vehicle crosses the rail. This feature reduces the accumulation of dust and dirt on the top surfaces of the rails by dropping them into the gaps in the cleaning unit.

In a fourth embodiment of the cleaning unit according to the invention, the elastic properties of the flexible arrangements associated with the bristle rails and the flexible arrangements associated with the intermediate rails are different. In a fifth embodiment of the cleaning unit according to the invention, the flexible arrangements associated with the bristle rails are more elastic than the flexible arrangements associated with the intermediate rails. This feature allows the rails to be tilted and the vibration they cause to be optimized. By reducing the inclination of the intermediate rails, the bristles are protected.

In a cleaning arrangement for vehicle tires according to an embodiment of the invention, the cleaning arrangement comprises at least one cleaning module having a frame having walls and a floor and a first end and a second end of the frame and a collection space for contaminants collected by the cleaning arrangement. According to a preferred embodiment of the invention, above the collection space there is a cleaning unit, or several cleaning units as described above, and the cleaning module is configured so that the direction of travel of the vehicle over the cleaning arrangement is parallel to the direction between the ends of the frame.

In one embodiment of the cleaning arrangement according to the invention, the collection space has a first side chamber and a second side chamber, said side chambers being on opposite walls of the frame and covering at least a part of the wall. In a second embodiment of the cleaning arrangement according to the invention, the first side chamber and the second side chamber support the grate arrangement of the cleaning unit.

In a third embodiment of the cleaning arrangement according to the invention, the frame has a blowing connection and a suction connection, the connections being connected to the collection space so that the blowing connection is connected to the first side chamber and the suction connection is connected to the second side chamber, and the first side chamber and the second side chamber have side chamber openings to the collection space. The blowing connection and the suction connection make it possible to clean the collection space with vacuum cleaners or the like. The openings concentrate the blowing and sucking action and thus increase the efficiency of cleaning the collection space.

In a fourth embodiment of the cleaning arrangement according to the invention, the openings of the side chambers are at the level of the floor of the frame, i.e. the floor forms part of the sides of the opening. Placing the openings at floor level controls the blowing and sucking action.

In a fifth embodiment of the cleaning arrangement according to the invention, the cleaning module has a water connection and an arrangement for conveying water to the surface of the tire of the vehicle crossing the cleaning module. The use of water binds fine dust and removes it from the surface of the tires.

In a sixth embodiment of the cleaning arrangement according to the invention, the cleaning module has a sensor arrangement for detecting the vehicle and initiating the conveyance of water to the surface of the vehicle tire.

In a seventh embodiment of the cleaning arrangement according to the invention, the cleaning arrangement comprises two or more cleaning modules, and the cleaning modules are configured to be placed side by side or in line or both to form cleaning arrangements of different sizes. This feature allows the cleaning arrangement to be scaled up to different applications and uses.

In an eighth cleaning arrangement according to the invention, the frame of the cleaning module or modules is at least partially below the surface of the floor or the like.

In a ninth embodiment of the cleaning arrangement according to the invention, the frame of the cleaning module or cleaning modules is at least partially above the surface of the floor or the like, and the ends of the cleaning arrangement have ramp arrangements.

An advantage of the invention is that it provides an arrangement capable of substantially removing dust and other dirt from the tires of a vehicle in an indoor setting. The arrangement according to the invention can also be easily placed in existing spaces without major changes. The arrangement according to the invention can be made substantially shorter than the devices of the prior art without the result being significantly inferior. Furthermore, the invention can be applied on an industrial scale without any significant changes.

The invention is also energy efficient. The invention is also easily dimensioned for vehicles of different sizes and different vehicle volumes. With the device according to the invention, the cleaning process is fast and automatic. The driver of the vehicle does not need to take any additional measures and does not have to leave the vehicle or stop the vehicle.

The invention also has the advantage that it can be used in different types of spaces.

A further advantage of the invention is that it does not spread water and dirt in its vicinity during use. Furthermore, the arrangement according to the invention can be easily cleaned through the suction chamber by means of vacuum suction, which can be enhanced with an opposite air blow.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

The invention is described in detail below. In the description, reference is made to the accompanying drawings in which.

6

Figure 6:
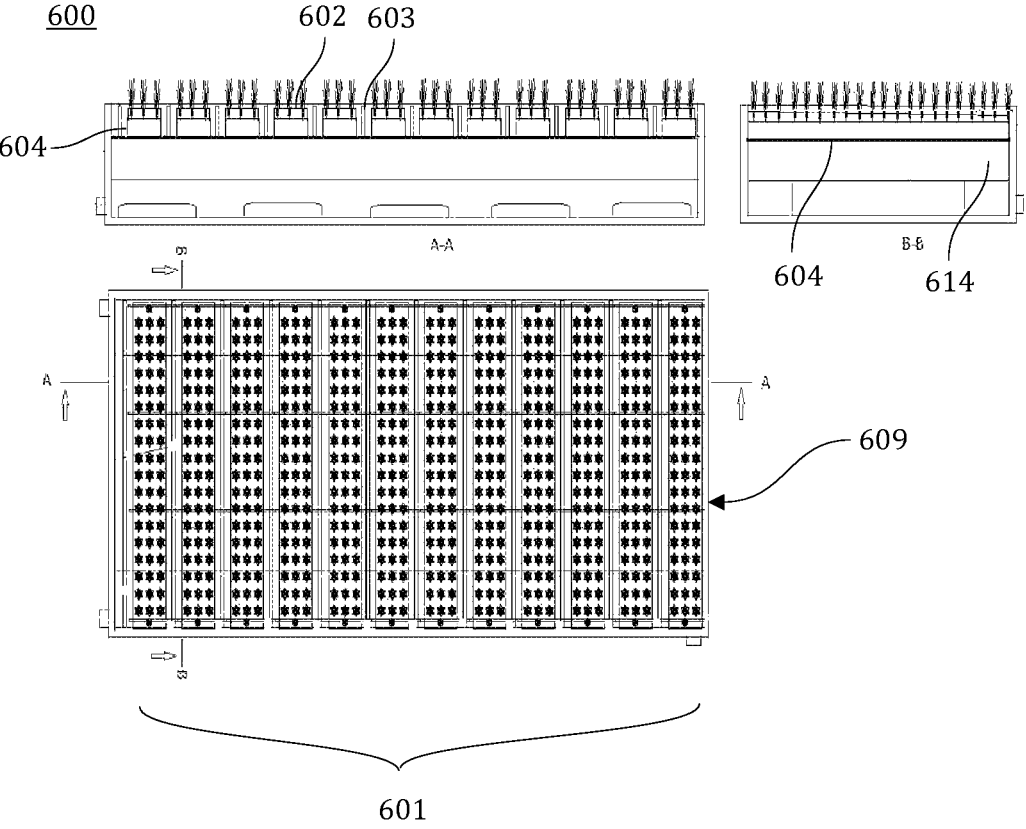

FIG. 6 shows an example of a fifth embodiment of the cleaning arrangement.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including not only one of A, only one of B, only one of C, or any combination of A, B, and C.

The embodiments in the following description are exemplary only, and a person skilled in the art may implement the basic idea of the invention in a manner other than that explained in the description. The description may in several places refer to an embodiment or embodiments, but this does not mean that the reference in question is directed to one described embodiment only or that the feature described is useful in one described embodiment only. Individual features of two or more embodiments can be combined, thus creating new embodiments of the invention.

Figure 1A:
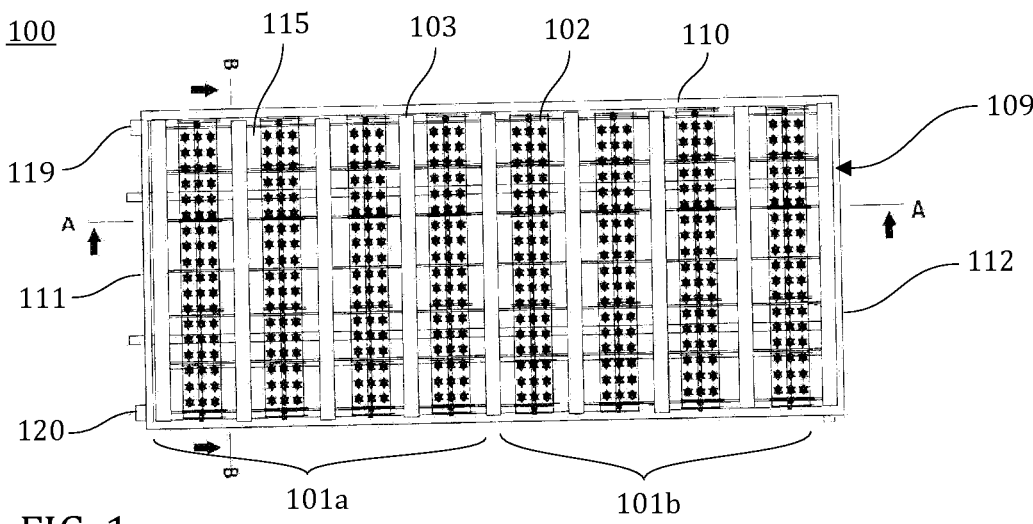
FIG. 1a shows an example of an embodiment of a cleaning arrangement seen from above.
Figure 1B:
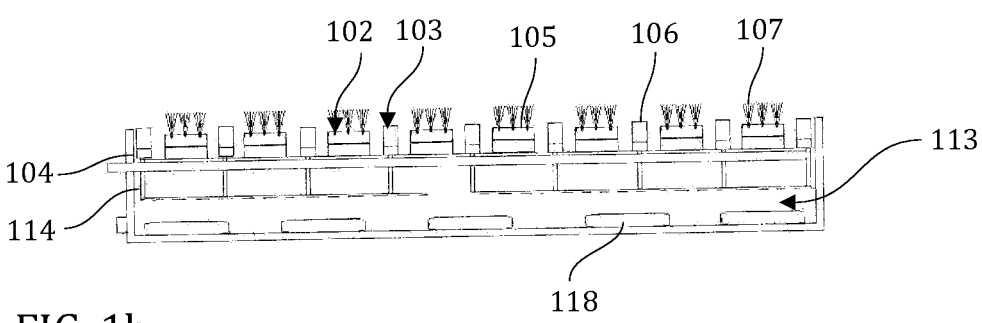
FIG. 1b shows a longitudinal section of the cleaning arrangement of FIG. 1a, FIG. 1c shows a cross-section of the cleaning arrangement of FIG. 1a, FIG. 2 shows an example of a frame and grate arrangement of another embodiment of the cleaning arrangement.
Figure 1C:
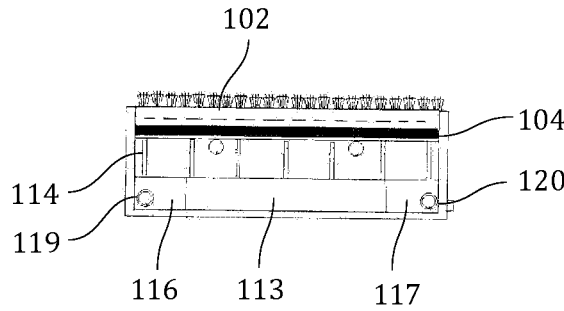

FIG. 1a shows an embodiment of a cleaning arrangement 100 for vehicle tires. The cleaning arrangement is viewed from above. FIG. 1b is a longitudinal section of the cleaning arrangement from A to A viewed from the side. FIG. 1c is a cross-section of the cleaning arrangement from B to B as viewed from the direction of the head of the cleaning arrangement. For clarity, FIGS. 1a, 1b and 1c will be considered together.

The cleaning arrangement 100 is an elongated structure configured so that the vehicle to be cleaned travels over the cleaning arrangement in the longitudinal direction. There are also embodiments in which the width of the cleaning arrangement is greater than its length. In that case, the cleaning arrangement comprises one or more cleaning modules. This embodiment has one cleaning module 109.

The cleaning module 109 has a frame 110 with walls and a floor, as well as a first end 111 of the frame and a second end 112 of the frame, and a collection space 113 for contaminants collected by the cleaning arrangement. The cleaning module is configured so that the direction of travel of the vehicles to be cleaned is between the ends of the frame, i.e. the vehicles travel from the first end of the frame towards the other end of the frame and vice versa. In some embodiments, the direction over the cleaning module is optimized, i.e., the cleaning effect is better in one or the other direction. The frame is a box-like structure that is open-topped. The frame is made of metal or a similar suitable material. There are embodiments in which the frame is formed by making a frame-shaped recess in, for example, a concrete floor or a similar solid surface. The shapes of the frame define the collection space 113.

Furthermore, the cleaning module 109 has one or more cleaning units 101. In the embodiment of FIG. 1, there are two cleaning units: a first cleaning unit 101a and a second cleaning unit 101b. The cleaning units are in the cleaning module so that they are above the collection space 113 and cover the collection space. The cleaning units remove dust, dirt and similar contaminants from the tires of the vehicle passing over them and direct them to the collection space.

The cleaning unit 101 comprises a grate arrangement 114, bristle rails 102, intermediate rails 103 and flexible arrangements 104. The upper surfaces of the rails define the upper surface of the cleaning unit. In the embodiment of FIG. 1, the grate arrangement is a grid formed of elongated metal plates on the edge of a vertical narrow side, i.e. the height of the plates is greater than the width. Of course, the grate arrangement can be implemented in other ways as well. The grate arrangement and the frame 110 of the cleaning module 109 are shaped so that the grate arrangement rests on the frame so that when the cleaning unit is in place, an empty space is left between the grate arrangement and the floor of the frame and the collection space 113 is in this empty space. To support the grate arrangement (and at the same time the cleaning unit), the frame may have configurations to which the parts of the grate arrangement fit. In some embodiments, additional support arrangements may be installed in the cleaning module to hold the grate arrangement in place. These additional support arrangements are such that they do not significantly affect the removal of collected dust from the collection space. In one embodiment, the additional support arrangement is a rod or rods attached to either the floor of the frame or the grate arrangement and prevents the grate arrangement from bending as the vehicle travels over it. What is essential about the grate arrangement is that it does not significantly impede the fall of contaminants through the cleaning unit into the collection space. This means that the openings in the grate arrangement are sufficiently large.

The bristle rail 102 is an elongated body having an upper surface 105 and a lower surface of the bristle rail. The upper surface of the bristle rail has bristles 107. The bristles remove material adhering to the vehicle tire, such as dust. The bristles are wire-like pieces with the upper ends above the upper surface of the cleaning unit 101. The bristles bend as the tire passes over them and return to their original position when the tire has passed them. In this embodiment, the bristles of all the bristle rails are in a substantially vertical position relative to the surface of the cleaning unit. In some embodiments, the bristles in different bristle rails are in different positions, and in some embodiments, the bristles of the same bristle rail are in different positions. The positioning, size and other properties of the bristles are selected according to the tires to be cleaned. The bristle rails are above the grate arrangement 114 transversely to the direction of travel beyond the vehicle cleaning unit 101, i.e., they extend from side wall to side wall.

There is one intermediate rail 103 between two adjacent bristle rails 102. The intermediate rail is an elongated body having an upper surface 106 and a lower surface of the intermediate rail. The intermediate rails are above the grate arrangement 114 transversely to the direction of travel beyond the vehicle cleaning unit 101, i.e., they extend from side wall to side wall. The intermediate rail and the surrounding bristle rails are positioned so that a gap 115 is left between the intermediate rail and the bristle rails, which is open to the collection space 113 so that the dust removed by the bristles can fall into the collection space through the gap. In one embodiment, the width of the gap is greater than the maximum size of the grit used in sanding roads. One common maximum grit size is 6 mm. The upper surface of the intermediate rail is higher than the upper surface 105 of the bristle rail. The distances between the intermediate rails and the bristle rails are adjusted so that the vehicle crossing the cleaning unit 101, and in particular its tires, is subjected to a vibrating or swaying motion, which enhances the release of dust and contaminants adhering to the tire. In addition, the intermediate rails are shaped and positioned relative to the bristle rails so that the full weight of the vehicle tire does not press against the bristles. In the example shown in FIG. 1, the width of the intermediary rails is less than the width of the bristle rails. By varying the ratio of the rail widths, the vibration caused by the rails can be optimized for different vehicles. The material of the rails may be, for example, plastic or composite material or the like.

The flexible arrangements 104 secure the bristle rails 102 and the intermediate rails 103 to the grate arrangement 114. The flexible arrangement is more elastic in its properties than the rail that fixes it to the grate arrangement, i.e., the rails are made of a more rigid material than the flexible arrangement. When the vehicle crosses the rail, the flexible arrangement changes shape due to the weight of the tire and its rotational movement, whereby the rail tilts in the direction of travel of the vehicle and regains its original shape when the tire crosses the rail. This movement enhances the vibration of the tire by adding new directions of movement. This also avoids excessive vibration of the vehicle, which can be annoying to the driver and in some cases harmful to the goods being transported. In addition, as the rail tilts more, the contaminants left on the top surface of the rail flow into the slot 115. This enhances the collection of dust and other contaminants. In some embodiments, the flexible arrangement is made of rubber or a rubber-like material. In some embodiments, the flexible arrangement below the bristle rail covers the lower surface of the bristle rail and the flexible arrangement below the intermediate rail covers the lower surface of the intermediate rail. This keeps the rails running smoothly and also equalizes the strain on the rails. In some embodiments, the elastic properties of the flexible arrangements associated with the bristle rails and the flexible arrangements associated with the intermediate rails are different, and the flexible arrangements associated with the bristle rails are more elastic than the flexible arrangements associated with the intermediary rails. This enhances the tilting of the bristle rails.

In the example shown in FIG. 1, the cleaning unit 101 has four bristle rails 102 and four intermediate rails 103. The cleaning module 109 has a first cleaning unit 101*a* and the second cleaning unit 101*b* is arranged in line so that the rails of the cleaning units are transverse to the direction of travel of the cleaning module and at the same time also with respect to the cleaning arrangement 100. The direction of travel here means the direction in which the vehicle crosses the cleaning arrangement. The cleaning units are detachable so that the collection space 113 can be inspected or cleaned. The detachability of the cleaning unit means that, for example, a damaged cleaning unit can be replaced, which substantially facilitates the maintenance of the cleaning arrangement 100. Similarly, different types of cleaning units can be replaced with a stationary cleaning system if, for example, the tires of the vehicles to be cleaned change, for example when switching to winter tires.

The collection space 113 has a first side chamber 116 and a second side chamber 117, said side chambers being on opposite walls of the frame and covering at least a part of the wall. The side chambers are hollow structures which, in this embodiment, extend from the first end 111 to the second end 112 of the frame, and the floor of the collection space and the frame 110 is between the side chambers. In the embodiment of FIG. 1, the side chambers are formed by bending a metal plate at a right angle and placing said plate against the side wall so that the wall, floor and plate of the frame form the walls of the side chamber, and the side chamber is permanently attached to the frame, for example, by welding. Of course, there are other ways to form a side chamber. Here, the side chambers are shaped so that their upper surface is flat and at a suitable height to support the grate arrangement 114 of the cleaning unit 101. In some embodiments, the upper surfaces of the side chambers and the frame side walls above the upper surfaces of the side chambers are sufficient to hold the cleaning unit in place. The walls of the side chambers on the side of the collection space have openings 118 in the side chambers. In the embodiment according to the figure, the width of the openings is greater than their height.

The cleaning module 109 has a blowing connection 119 and a suction connection 120. Said connections are configured to be connected to an arrangement or arrangements which, in order to empty the collection space of the accumulated material, provide air flow or vacuum to the collection space. These arrangements can be implemented, for example, with compressed air, an industrial vacuum cleaner or some other separate device or system. The arrangement may be fixed or movable. The arrangement may be turned on, for example, by a timer or photocell, after the vehicle has passed the cleaning arrangement 100, or manually. In the embodiment shown, the connections are at the first end 111 of the frame 110. Of course, they may be positioned in other ways. The blowing connection is connected to the first side chamber 116 so that air can be blown into the interior of the first side chamber. The suction connection is connected to the second side chamber 117 so that air can be sucked in from the interior of the second side chamber, whereby underpressure is created inside the second side chamber compared to the pressure in the collection space 113. Air jets are discharged from the openings 118 of the first side chamber into the collection space, and air is sucked from the collection space into the second side chamber through the openings in the second side chamber. The air jets in the collection chamber transfer the dust and other material in the collection space to the interior of the second side chamber, from where they leave through the suction connection for processing elsewhere. In some embodiments, there may be shapes within the side chambers that enhance flows in the collection chamber. In some embodiments, the functionalities of the blowing connection and the suction connection are interchangeable, i.e., the blowing connection becomes a suction connection and vice versa. This can be done by changing the location of the joints of the external arrangements. There are embodiments in which the currents caused by the blowing connection and the suction connection can also be realized at least in part with water. This is useful if water is used in the cleaning arrangement 100 for cleaning.

Figure 2:
Figure 2:
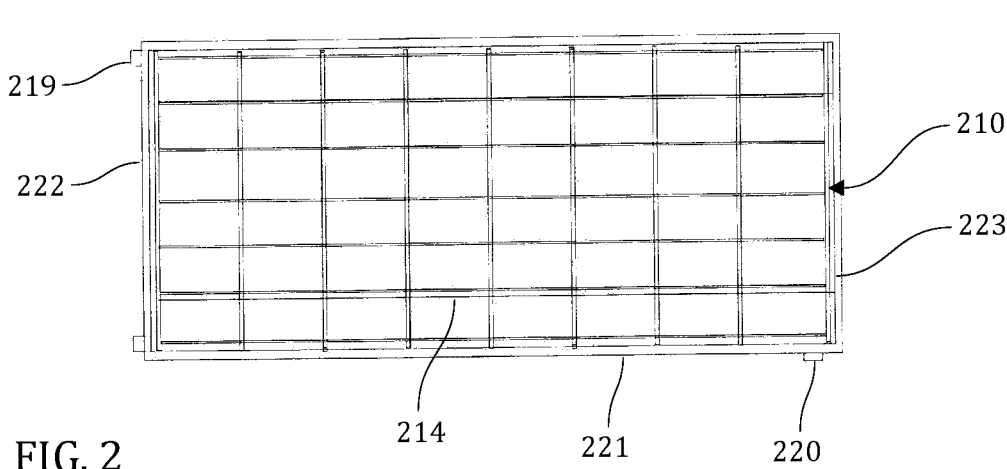

FIG. 2 shows an example of a frame 210 and a grate arrangement 214 of another embodiment of the cleaning arrangement 200 as viewed from above. Parts of the cleaning arrangement have been omitted for clarity.

The frame 210 is a box-like structure with an open top surface. The frame has a first end wall 222 of the frame, a second end wall 223 of the frame, and side walls 221 of the frame between the ends of the frame. One or more cleaning units are put in place to cover the top surface of the frame. The cleaning unit has a grate arrangement 214 and a plurality of rails on top of the grate arrangement to remove contaminants from the vehicle tires. The upper surface of the cleaning unit is substantially flush with the upper edges of the frame. The grate arrangement relies on the frame or other support arrangements so that there is a collection space under the grate arrangement.

The frame 210 has a blowing connection 219 and a suction connection 220. Inside the frame there is a side chamber with openings against each side wall 221. The blowing connection and the suction connection are each connected to their own side chamber. In this embodiment, the blowing connection is in the first end wall 222 of the frame and the suction connection is in the side wall of the frame, in the vicinity of the second end wall 223 of the frame. The joints are thus in the vicinity of opposite corners of the frame at different ends of the frame. With this arrangement, the flow inside the collection space can be smoothened. The openings in the side chamber in the vicinity of the blowing connection, i.e. near the first end wall of the frame, experience a stronger flow than the openings near the second end wall of the frame. Correspondingly, the suction flow of the openings in the side chamber on the opposite side wall is greater in the vicinity of the second end wall of the frame than in the vicinity of the first end wall of the frame. In this way, the flows in the collection space are equalized and the cleaning effect of the flows is approximately equal over the entire area of the collection space. In some embodiments, optimizing the locations of the blowing connection and the suction connection can provide a more efficient contaminant transfer effect to one area of the collection space than to other areas.

Figure 3:
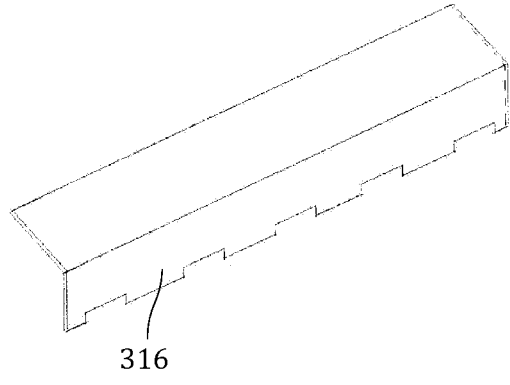
FIG. 3 shows an example of the side chambers of an embodiment of the cleaning arrangement.
Figure 3:
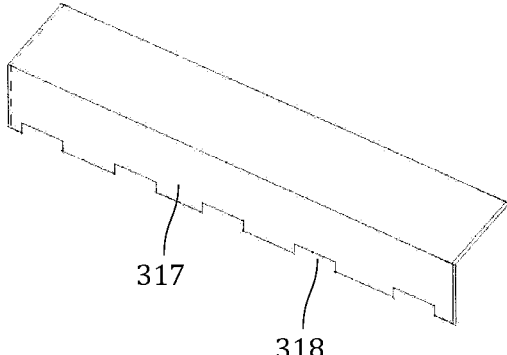

FIG. 3 shows an example of a first side chamber 316 and a second side chamber 317 of an embodiment of a cleaning arrangement. The side chambers are formed by bending an elongate metal plate in the direction of the longitudinal axis at a right angle. In this embodiment, the bending point is selected so that the width of the upper surface of the side chamber and the height of the side surface are equal. Of course, this may vary in different embodiments. At the edge of the side surface of the side chamber, i.e. the edge facing the floor of the frame, there are rectangular notches which form the openings 318 in the side chambers when the plate is placed inside the frame. In some embodiments, the upper surfaces of the side chambers act as support surfaces for the cleaning units.

Figure 4:
FIG. 4 shows an example of a third embodiment of the cleaning arrangement.
Figure 4:
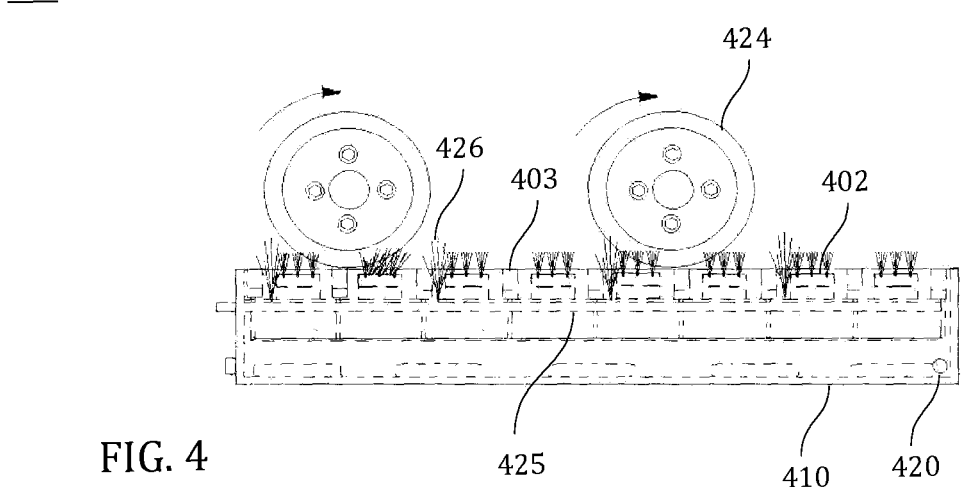

FIG. 4 is a side view of an example of a third embodiment of the cleaning arrangement 400. The cleaning arrangement includes at least one cleaning module having a frame 410, a cleaning unit, a suction connection 420, and an arrangement for conveying water 425 to the vehicle tires 424. Water is used to wash the tires and bind dust. The cleaning unit has bristle rails 402 and intermediate rails 403. The cleaning arrangement has a water connection to which an external water source is connected. The water connection is connected to an arrangement for conveying water. The water transport arrangement has nozzles that spray water jets 426 in the vicinity of the tire. The nozzles can be actuated by a sensor arrangement that detects the vehicle. In some embodiments, the bristles on the bristle rails are wetted, which in turn wet the tires. The water used for cleaning accumulates at the bottom of the frame in the collection space. Water is removed from there by a pump or vacuum arrangement through a suction connection. In some embodiments, the amount of water is monitored with a sensor arrangement and dewatering is performed when the water level exceeds a certain threshold. In some embodiments, the water surface level is kept constant and at such a height that when the vehicle crosses the cleaning arrangement, the movement of the rails and bristles transfers water to the tires. In this case, nozzles may not be required. In some embodiments, when water is used, no blowing connection is required in the cleaning module. In some embodiments where water is not allowed to accumulate at the bottom of the frame, the blowing connection can enhance the transfer of the water to be removed to the suction connection by providing an air flow to the collection space. At the same time, the collection space can be dried. There are also embodiments in which an air blowing arrangement is provided in the cleaning module. This is used to dry wet tires.

Figure 5:
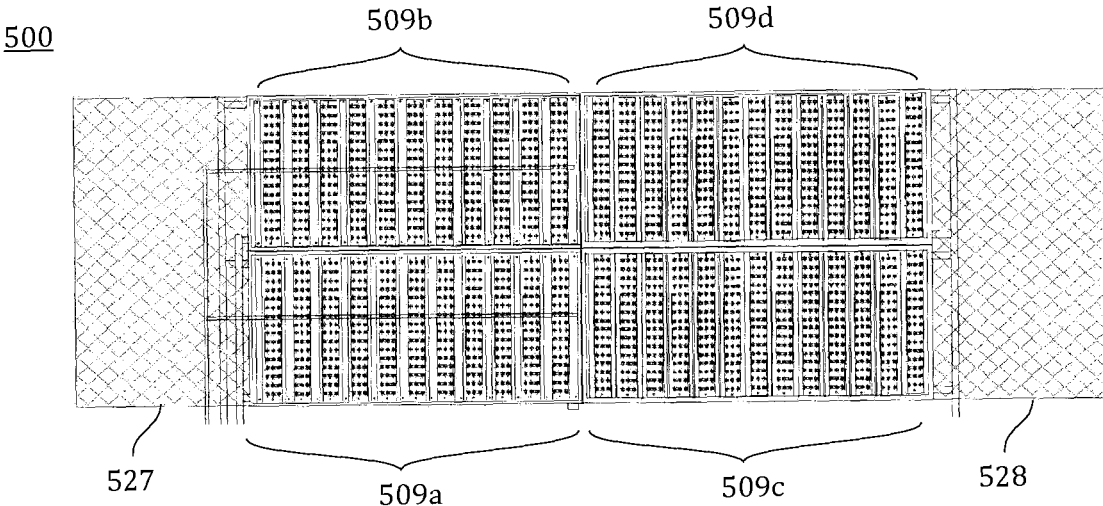
FIG. 5 shows an example of a fourth embodiment of the cleaning arrangement.

FIG. 5 shows an example of a fifth embodiment of the cleaning arrangement 500. The cleaning arrangement comprises four cleaning modules: a first cleaning module 509*a*, a second cleaning module 509*b*, a third cleaning module 509*c*, and a fourth cleaning module 509*d*. The cleaning arrangement further includes a first ramp 527 and a second ramp 528. The cleaning arrangement has a first end and a second end. The first ramp is at the first end of the cleaning arrangement and the second ramp is at the second end of the cleaning arrangement. The ramps are used when the frame of the cleaning modules is completely or partially above the floor surface. The cleaning modules have one or more cleaning units. The cleaning modules are interconnected so that the cleaning units form a uniform cleaning surface, and the vehicles to be cleaned pass over the cleaning surface in the direction between the ends of the cleaning arrangement. The first cleaning module and the second cleaning module are connected in parallel, i.e. together they form the first end of the cleaning arrangement. Likewise, the third cleaning module and the fourth cleaning module are connected in parallel, i.e. together they form the other end of the cleaning arrangement. In the embodiment shown, the first cleaning module and the second cleaning module have an arrangement for conveying water to the surface of the vehicle tires, and the third cleaning module and the fourth cleaning module have an air blowing arrangement for drying the tires. By combining cleaning modules, different cleaning arrangements can be formed that can be optimized for different applications.

FIG. 6 shows an example of a sixth embodiment of the cleaning arrangement 600. The cleaning arrangement is shown from three directions similar to FIG. 1. The cleaning arrangement comprises one cleaning module 609 having one cleaning unit 601. The cleaning unit comprises a grate arrangement 614, bristle rails 602, intermediate rails 603 and flexible arrangements 604. The embodiment of FIG. 6 differs from the technical implementation of the embodiment of FIG. 1 in that the intermediate rails are narrower than those in the embodiment of FIG. 1 and they are attached directly to the grate arrangement, so that there are no flexible arrangements between the intermediate rails and the grate arrangement. This feature reinforces the vertical movement of the vehicle as it passes over the cleaning arrangement. Of course, the intermediate rails may be of a different size than shown in this embodiment.

Finally, it should be noted that the description of the invention and the exemplary embodiments are not to be understood as limiting in terms of a particular physical realisation of the invention. The scope of protection of the present invention is given by the claims and is not limited by the features illustrated in the description or shown in the figures.

The invention claimed is:

1. A cleaning unit for cleaning vehicle tires, the cleaning unit comprising:
    a grate arrangement;
    a plurality of bristle rails comprising elongated bodies a bristle rail top surface and bristles arranged on the bristle rail top surface,
    wherein the bristle rails are arranged above the grate arrangement transverse to the vehicle cleaning unit;
    wherein the vehicle cleaning unit further comprises intermediate rails and flexible arrangements, the intermediate rails comprising an upper surface and elongated bodies arranged above the grate arrangement, at least a portion of the intermediate rails are arranged between the bristle rails such that a gap is formed between at least a portion of the bristle rails and the intermediate rails, and
    wherein the bristle rails are attached to the grate arrangement with the flexible arrangements, the flexible arrangement being more elastic than the rail which it attaches to the grate arrangement,
    wherein the upper surface of the intermediate rails is arranged between an upper surfaces of the bristle rails and the planes formed by the outer ends of the bristles;
    wherein the intermediate rails are fastened to the grate arrangement by means of flexible arrangements;
    wherein the bristle rails comprise a lower surface of the bristle rail;
    wherein the intermediate rails comprise a lower surface of the intermediate rails, and
    wherein the flexible arrangements below the bristle rails cover the lower surfaces of the bristle rails and the flexible arrangements below the intermediate rails are arranged to cover the lower surfaces of the intermediate rails.

2. The cleaning unit according to claim 1, wherein the flexible arrangements comprise elastic properties such that when vehicle travels across the cleaning unit, the bristle rails and the intermediate rails tilt as the vehicle tire crosses the rail.

3. The cleaning unit according to claim 1, wherein the elastic properties of the flexible arrangements associated with the bristle rails and the flexible arrangements associated with the intermediate rails are different.

4. The cleaning unit according to claim 3, wherein the flexible arrangements associated with the bristle rails are more elastic than the flexible arrangements associated with the intermediate rails.

5. A cleaning arrangement for vehicle tires, comprising:
    at least one cleaning module comprising a frame having walls, a floor, a first end a second end, a collection space configured to contain contaminants collected by the cleaning arrangement, one or more cleaning units arranged above the collection space, if the cleaning unit has a grate arrangement and a plurality of bristle rails having bristle rail top surfaces, the bristle rails having bristles arranged on the top surface of the bristle rail,
    wherein the bristle rails comprise elongated bodies above the grate arrangement transverse to the direction of travel of a vehicle over cleaning unit,
    wherein the cleaning unit further comprises intermediate rails and flexible arrangements, an upper surface and the intermediate rails comprise elongated bodies above the grate arrangement and at least a portion of the intermediate rails are between the bristle rails such that a gap between at least a portion of the bristle rails and the intermediate rails is formed,
    wherein the bristle rails are attached to the grate arrangement by the flexible arrangements,
    wherein the flexible arrangement has more elastic properties than the rail that it attaches to the grate arrangement and the upper surface of the intermediate rails is between the upper surfaces of the bristle rails and the planes formed by the outer end of the bristles, and wherein the cleaning module is configured so that the direction of travel of the vehicle over the cleaning arrangement is parallel to the direction between the ends of the frame.

6. The cleaning arrangement according to claim 5, wherein the collection space comprises a first side chamber and a second side chamber, the side first side chamber and the second side chamber are arranged on opposite walls of the frame and cover at least part of the wall.

7. The cleaning arrangement according to claim 6, wherein the first side chamber and the second side chamber are arranged to support the grate arrangement of the cleaning unit.

8. The cleaning arrangement according to claim 6, wherein the frame comprises a blowing connection and a suction connection such that the blowing connection and suction are connected to a collection space such that the blowing connection connects to the first side chamber and the suction connection connects to the second side chamber, and the first side chamber and the second side chamber comprise openings to the collection space.

9. The cleaning arrangement according to claim 8, wherein the openings to the collection space are arranged at a floor level of the frame and the floor forms part of the sides of the opening.

10. The cleaning arrangement according to claim 5, wherein the cleaning module comprises a water connection and an arrangement for conveying water across the cleaning module And onto a surface of the vehicle tire.

11. The cleaning arrangement according to claim 10, wherein the cleaning module comprises a sensor arrangement configured to detect the vehicle and initiate conveyance of water to the surface of the vehicle tire.

12. The cleaning arrangement according to claim 5, wherein the cleaning arrangement comprises two or more cleaning modules configured to be inserted side by side and/or in line so as to form cleaning arrangements of different sizes.

13. The cleaning arrangement according to claim 5, wherein the frame of the cleaning module or the cleaning modules is arranged at least partially above the floor surface, and ramp arrangements are arranged at ends of the cleaning arrangement.

\* \* \* \* \*